(12) United States Patent
Wang et al.

(10) Patent No.: US 11,788,441 B2
(45) Date of Patent: *Oct. 17, 2023

(54) FULLY VARIABLE ELECTRO-HYDRAULIC VALVE SYSTEM HAVING BUFFERING FUNCTION

(71) Applicant: WEIFANG LICHUANG ELECTRONIC TECHNOLOGY CO., LTD, Weifang (CN)

(72) Inventors: Lifeng Wang, Weifang (CN); Xiuqiang Wang, Weifang (CN)

(73) Assignee: WEIFANG LICHUANG ELECTRONIC TECHNOLOGY CO., LTD, Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/790,701

(22) PCT Filed: Dec. 29, 2020

(86) PCT No.: PCT/CN2020/140573
§ 371 (c)(1),
(2) Date: Jul. 1, 2022

(87) PCT Pub. No.: WO2021/136225
PCT Pub. Date: Jul. 8, 2021

(65) Prior Publication Data
US 2023/0003145 A1 Jan. 5, 2023

(30) Foreign Application Priority Data
Jan. 4, 2020 (CN) .......................... 202010007431.6

(51) Int. Cl.
*F01L 9/14* (2021.01)
*F01L 9/16* (2021.01)
(Continued)

(52) U.S. Cl.
CPC ........ *F01L 9/14* (2021.01); *F01L 9/16* (2021.01); *F01L 9/20* (2021.01); *F01L 9/40* (2021.01)

(58) Field of Classification Search
CPC ....... F01L 9/10; F01L 9/14; F01L 9/16; F01L 9/20
See application file for complete search history.

(56) References Cited

U.S. PATENT DOCUMENTS

2023/0031051 A1* 2/2023 Wang .................. F01L 13/0015

FOREIGN PATENT DOCUMENTS

| CN | 201811368346 | 2/2019 |
| CN | 110486110 | 11/2019 |

(Continued)

OTHER PUBLICATIONS

International Search Report for corresponding International Patent Application No. PCT/CN2020/140573, dated Mar. 25, 2021.

*Primary Examiner* — Ngoc T Nguyen
(74) *Attorney, Agent, or Firm* — LOZA & LOZA, LLP; Michael Fedrick (57) ABSTRACT

A fully variable electro-hydraulic valve system having a buffering function, comprising: a camshaft (101), a valve assembly (106), a sliding sleeve (103), a spiral shaft (102), a piston (105), and a position restoring spring (104). The sliding sleeve (103) is fixed relative to an engine, the piston (105) abuts against the valve assembly (106), and the spiral shaft (102) is controlled by a cam surface of the camshaft (101) in the axial direction. sliding sleeve (103) is provided with a buffering oil hole (123) that communicates with a buffering cavity (R) and with a low-pressure oil circuit of the engine by means of a throttling device (124). When a valve is going to be seated, the piston collides with a buffering ring (121), and due to the effect of the throttling device, engine (Continued)

oil within the buffering cavity has a damping effect on the movement of the buffering ring.

10 Claims, 4 Drawing Sheets

(51) Int. Cl.
*F01L 9/20* (2021.01)
*F01L 9/40* (2021.01)

(56) References Cited

FOREIGN PATENT DOCUMENTS

| | | |
|---|---|---|
| CN | 110985156 | 4/2020 |
| CN | 111075531 | 4/2020 |
| CN | 111206973 | 5/2020 |
| CN | 211343050 | 8/2020 |

* cited by examiner

FULLY VARIABLE ELECTRO-HYDRAULIC VALVE SYSTEM HAVING BUFFERING FUNCTION

CROSS-REFERENCE TO RELATED APPLICATIONS

This application is the U.S. national stage of International Patent Application No. PCT/CN2020/140573, filed on Dec. 29, 2020 and entitled FULLY VARIABLE ELECTRO-HYDRAULIC VALVE SYSTEM HAVING BUFFERING FUNCTION, which claims the benefit of priority under 35 U.S.C. § 119 from Chinese Patent Application No. CN202010007431.6 filed on Jan. 4, 2020. The disclosures of the foregoing applications are incorporated herein by reference in their entirety.

FIELD

The present invention relates to the technical field of engine valve systems, in particular to a fully variable electro-hydraulic valve system having a buffering function.

BACKGROUND

A fully variable valve system (FVVS) can realize continuous variability of a maximum lift of a valve, a valve opening duration angle and a valve timing, which is of great significance for energy saving and emission reduction of engines. The FVVS can control the number of working media entering an air cylinder by means of early intake valve closing (EIVC), thereby omitting a throttle valve. Such a throttle-valve-free gasoline engine will greatly reduce the pumping loss and reduce the fuel consumption under low and medium loads by 10-15%. The FVVS is matched with a supercharged intercooler, which can solve the problems of deflagration and high heat load after an engine is supercharged. Low-temperature combustion is achieved while a mean effective pressure is greatly increased. The heat efficiency of the engine is improved, and emission of harmful gas is reduced. Therefore, an FVVS technology has become one of the important development directions of a new internal combustion engine technology.

At present, a more advanced FVVS is a MultiAir (also referred to as UniAir) system jointly developed by Schaeffler and Fiat. The system adopts a camshaft-driven electro-hydraulic valve system, and the movement of a valve is jointly controlled by a camshaft and an electromagnetic valve. The working principle of the system is as follows: a hydraulic piston is driven by a cam; the hydraulic piston is connected to a driving piston through a sliding sleeve cavity; and the sliding sleeve cavity is controlled by a switching electromagnetic valve. When the electromagnetic valve is fully closed, the hydraulic piston pushes the driving piston through a liquid pressure, and transmits a hydraulic pressure generated by rotation of the cam to a valve; and at this time, an intake valve is completely controlled by the cam and is opened. When the electromagnetic valve is fully opened, the hydraulic pressure cannot transmit a driving force, and the hydraulic piston cannot push the driving piston; and the intake valve is no longer controlled by the cam and falls back or is closed. By means of controlling the opening and closing moment of the electromagnetic valve, various valve motion laws can be realized, and functions of the FVVS can be realized. However, the electromagnetic valve of the FVVS is complicated in structure and expensive, which limits the popularization and application of this technology.

In order to replace the expensive high-speed electromagnetic valve, Chinese invention patent CN109339896A discloses a fully variable electro-hydraulic valve device with a buffering function, comprising: a camshaft, a valve assembly, a spiral shaft, a sliding sleeve, a piston and a position restoring spring. The spiral shaft and the piston are connected with the sliding sleeve in a sliding sealing manner; the piston abuts against the valve assembly; in the sliding sleeve, a sealed sliding sleeve cavity is formed in a space between the spiral shaft and the piston; the reset spring is clamped between the spiral shaft and the piston; the spiral shaft is controlled by a cam surface of the camshaft in the axial direction; the circumferential wall of the spiral shaft that is connected with the sliding sleeve in a sliding sealing manner is a spiral circumferential wall; the end of the spiral shaft is provided with a control gear meshed with a rack; the rack is driven by a linear actuator controlled by an electric control unit of the engine; the sliding sleeve is provided with an oil inlet hole and a limiting oil hole; the oil inlet hole is close to the spiral shaft; the limiting oil hole is close to the piston; the oil inlet hole and the limiting oil hole communicate with a low-pressure oil circuit of the engine; and a one-way valve is arranged on a connecting pipeline between the limiting oil hole and the low-pressure oil circuit of the engine. In this invention, the spiral shaft and the camshaft are jointly used to control the movement of the valve; the opening and closing moment of the oil inlet hole is changed by rotating the spiral shaft, so that the functions of the FVVS can be realized, and this invention has high response speed and is convenient to control; and this invention replaces the expensive high-speed electromagnetic valve and is suitable for being used in a multi-cylinder engine.

However, in the application of the device, it is found that the mechanism has the problem of too fast seating speed in the process of electro-hydraulically controlling the valve to be seated, which causes impact damage to the valve and a sealing surface of a valve seat, and affects the service life. Moreover, in the shutdown process of the engine, hydraulic oil in the sliding sleeve cavity will leak slowly. When the engine is started, the phenomenon of "no oil" may appear in the sliding sleeve cavity, which will cause failure of the system.

SUMMARY

For the shortcomings in the prior art, the present invention provides a fully variable electro-hydraulic valve system having a buffering function, so as to reduce the seating speed of a valve, relieve the impact damage caused to a valve and a sealing surface of a valve seat, and prolong the service life.

In order to solve the above technical problems, the present invention adopts the following technical solution:

A fully variable electro-hydraulic valve system having a buffering function comprises a camshaft, a valve assembly, a sliding sleeve, a spiral shaft, a piston and a position restoring spring; the sliding sleeve is fixed relative to an engine; the spiral shaft and the piston are connected to the sliding sleeve in a sliding sealing manner; an inner cavity between the spiral shaft and the piston is referred to as a sliding sleeve cavity; the position restoring spring is clamped between the spiral shaft and the piston; the piston abuts against the valve assembly; the spiral shaft is controlled by a cam surface of a camshaft in the axial direction; the spiral shaft has a first end and a second end which are oppositely disposed; a spiral surface is provided at the first end; the second end is in transmission connection with a gear-rack mechanism; the gear-rack mechanism comprises a control gear and a rack; the control gear is arranged at the second end of the spiral shaft; the rack is driven by a linear actuator controlled by an electric control unit of the engine; an oil inlet hole and a limiting oil hole are formed in the sliding sleeve and communicate with a low-pressure oil circuit of the engine; a one-way valve is arranged on a connecting pipeline between the limiting oil hole and the low-pressure oil circuit of the engine; a step hole structure is provided at the end, where the piston is located, of the sliding sleeve and comprises a large hole and a small hole; the small hole is matched with a sliding sealing surface of the piston; a buffering ring is arranged in the large hole; the buffering ring sleeves the sliding sealing surface of the piston and is in sliding sealing fit with an inner circumferential surface of the large hole; the buffering ring and the piston form a buffering cavity in the step hole; a flange used for colliding with the buffering ring when a valve of the valve assembly is seated is arranged on a circumferential surface of an outer end of the piston; a baffle plate is mounted at the end, where the piston is located, of the sliding sleeve; when the valve of the valve assembly is closed, a buffering distance is reserved between the buffering ring and the baffle plate; a buffering oil hole communicating with the buffering cavity is formed in the sliding sleeve; and the buffering oil hole communicates with the low-pressure oil circuit of the engine through a throttling device.

The spiral shaft is provided with an annular slot; an oil passing hole is formed in the annular slot; the oil passing hole enables the annular slot to communicate with the sliding sleeve cavity; the oil inlet hole is always kept in communication with the annular slot in a moving process of the spiral shaft; the head of the spiral surface of the spiral shaft is provided with a spiral shaft abutting plane; the end of the piston that is opposite to the spiral shaft is provided with a piston axial protrusion; the head of the piston axial protrusion is provided with a piston abutting plane; the sliding sleeve is provided with a first positioning pin; the piston is provided with a guide slot extending in the axial direction; the first positioning pin extends into the guide slot; the limiting oil hole is arranged at a position where the limiting oil hole is blocked by the spiral shaft before the spiral surface touches the piston abutting plane; the gear-rack mechanism is also provided with a limiting device and a return spring; when the return spring enables the rack to move to an extreme position defined by the limiting device, the piston abutting plane abuts against the spiral shaft abutting plane; and a valve lift of the valve assembly is controlled by the camshaft.

The first end of the spiral shaft is provided with a spiral shaft axial protrusion; the head of the spiral shaft axial protrusion is provided with another spiral shaft abutting plane; the root of the spiral surface intersects the root of the spiral shaft axial protrusion; two piston axial protrusions are provided; the heads of the two piston axial protrusions are each provided with one piston abutting plane; and the piston abutting planes are in one-to-one correspondence to the spiral shaft abutting plane.

The two piston abutting planes are coplanar, and the two spiral shaft abutting planes are coplanar.

The two piston abutting planes are symmetric about the center of the piston, and the two spiral shaft abutting planes are symmetric about the center of the spiral shaft.

The second end of the spiral shaft is provided with a thrust bearing, and an anti-wear pad is arranged between the thrust bearing and the cam surface of the camshaft.

The control gear is connected to the spiral shaft in a manner of transmitting a torque.

The rack is simultaneously meshed with the control gears of a plurality of spiral shafts.

The linear actuator is a linear motor or an actuation electromagnet or air cylinder or hydraulic cylinder.

The sliding sleeve is provided with a second positioning pin which extends into the annular slot.

After the above-mentioned technical solution is adopted, the present invention has the technical effects below:

1) In the present invention, the spiral shaft and the camshaft are jointly used to control the movement of a valve, and the opening and closing moment of the limiting oil hole is changed by rotating the spiral shaft, thus realizing the functions of the fully variable valve system. During the return stroke, hydraulic oil enters the sliding sleeve cavity from the oil inlet hole to enable the spiral shaft to be quickly reset together with the position restoring spring. The linear actuator controlled by the electric control unit of the engine drives the spiral shaft to rotate, so that the fully variable valve system has high response speed, is convenient to control, replaces an expensive high-speed electromagnetic valve, and is suitable for being used in a multi-cylinder engine.

2) When the valve is going to be seated, the piston firstly collides with the buffering ring; due to the effect of the throttling device, engine oil within the buffering cavity has a damping effect on the movement of the buffering ring to enable the buffering ring to move slowly, such that the valve is slowly seated, thus reducing the impact damage caused to the valve and a sealing surface of a valve seat, thereby effectively prolonging the service life of the valve system. When the valve moves down again, the buffering ring moves downward under the action of the pressure of the engine oil. Since the buffering distance is extremely short, before the valve is seated again, there is enough time for the buffering ring to move to the position of the baffle plate. The valve buffering effect can be adjusted by adjusting the throttling effect and the buffering distance of the throttling device.

3) After the engine is shut down, and an electric control unit (ECU) is powered off, the rack moves to the extreme position limited by the limiting device under the action of the return spring; at this time, the piston abutting plane abuts against the spiral shaft abutting plane, and the engine oil does not work; the cam and the valve are in a rigid connection state; a valve lift of the valve assembly is completely controlled by the camshaft, so that the influence caused by loss of the engine oil on the normal work of the system is avoided.

101: camshaft; 102: spiral shaft; 102A: control gear; 102B: spiral shaft abutting plane; 102C: spiral shaft axial protrusion; 102D: annular slot; 102E: spiral surface; 102F: oil passing hole; 103: sliding sleeve; 104: position restoring spring; 105: piston; 105A: piston axial protrusion; 105B: piston abutting plane; 105C: guide slot; 105D: flange; 106: valve assembly; 107: oil inlet hole; 108: one-way valve; 109: oil pan; 110: pressure retaining valve; 111: anti-wear pad; 112: thrust bearing; 113: rack; 114: pressure reducing valve; 115: return spring; 116: limiting device; 117: linear actuator; 118: limiting oil hole; 119: first positioning pin; 120: second positioning pin; 121: buffering ring; 122: baffle plate; 123: buffering oil hole; 124: throttling device; G: theoretical spiral surface extreme position; P: piston abutting plane edge point; Q: sliding sleeve cavity; R: buffering cavity; S: buffering distance.

DETAILED DESCRIPTION OF THE EMBODIMENTS

The present invention will be further described below in combination with the accompanying drawings and embodiments.

Figure 1:
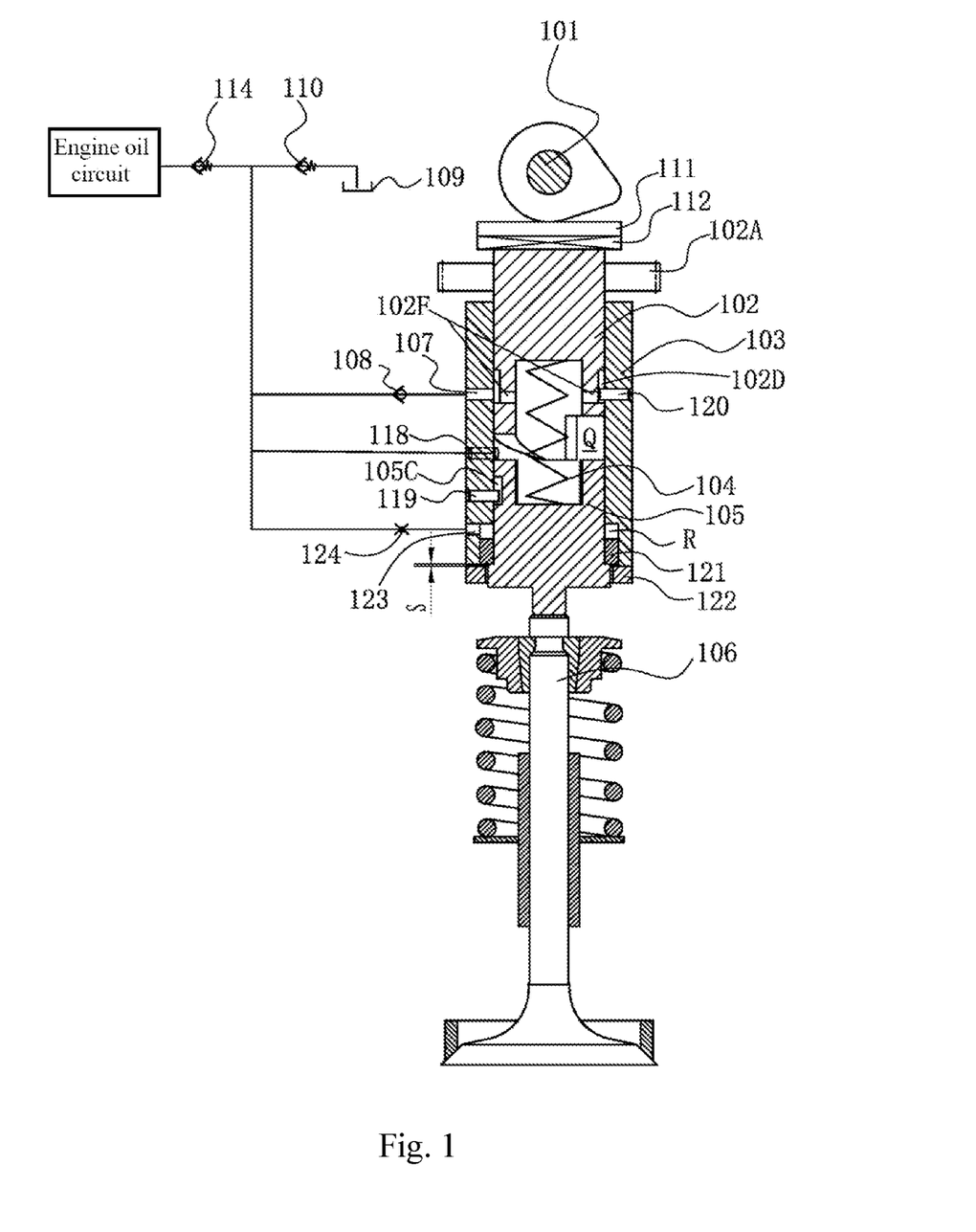
FIG. 1 is a sectional view of an embodiment of a fully variable electro-hydraulic valve system having a buffering function of the present invention.

As shown in FIG. 1 which shows a fully variable electro-hydraulic valve system having a buffering function, a sliding sleeve 103 is fixed relative to an engine, a spiral shaft 102 and a piston 105 are connected to the sliding sleeve 103 in a sliding sealing manner, the spiral shaft 102 is controlled by a cam surface of a camshaft 101 in the axial direction, and the piston 105 abuts against a valve assembly 106.

In the sliding sleeve 103, a space between the spiral shaft 102 and the piston 105 is a sliding sleeve cavity Q, and a position restoring spring 104 is clamped between the spiral shaft 102 and the piston 105. An oil inlet hole 107 and a limiting oil hole 118 (represented by dotted lines in FIG. 1) are formed in the sliding sleeve 103. The oil inlet hole 107 is connected to a one-way valve 108, communicates with an engine oil circuit through a pressure reducing valve 114, and communicates with an oil pan 109 through a pressure retaining valve 110. The limiting oil hole 118 communicates with the engine oil circuit through the pressure reducing valve 114 and communicates with the oil pan 109 through the pressure retaining valve 110.

A step hole structure is provided at the end, where the piston is located, of the sliding sleeve 103 and comprises a large hole and a small hole; the small hole is matched with a sliding sealing surface of the piston 105; a buffering ring 121 is arranged in the large hole; the buffering ring 121 sleeves the sliding sealing surface of the piston 105 and is in sliding sealing fit with an inner circumferential surface of the large hole; the buffering ring 121 and the piston 105 form a buffering cavity R in the step hole; a flange 105D used for colliding with the buffering ring 121 when a valve of the valve assembly 106 is seated is arranged on a circumferential surface of an outer end of the piston 105; a baffle plate 122 is mounted at the end, where the piston is located, of the sliding sleeve 103; and when the valve of the valve assembly 106 is closed, a buffering distance S is reserved between the buffering ring 121 and the baffle plate 122.

A buffering oil hole 123 communicating with the buffering cavity R is also formed in the sliding sleeve 103. The buffering oil hole 123 is connected to a throttling device 124, communicates with the engine oil circuit through the pressure reducing valve 114 and communicates with the oil pan 109 through the pressure retaining valve 110. The engine oil circuit and the pressure reducing valve 114, the pressure retaining valve 110, the oil pan 109 and the like associated with the engine oil circuit form a low-pressure oil circuit of the engine. The throttling device can be a throttling valve or a throttling hole.

The above-mentioned structure has a buffering function. When the valve is going to be seated, the piston 105 firstly collides with the buffering ring 121; due to the effect of the throttling device 124, engine oil within the buffering cavity R has a damping effect on the movement of the buffering ring 121 to enable the buffering ring 121 to slowly move, such that the valve is slowly seated, thus reducing the impact damage caused to the valve and a sealing surface of a valve seat, thereby effectively prolonging the service life of a valve system. When the valve moves downward again, the buffering ring 121 moves downward under the action of the pressure of the engine oil. Since the buffering distance S is extremely short, before the valve is seated again, there is enough time for the buffering ring 121 to move to the position of the baffle plate 122. The valve buffering effect can be adjusted by adjusting the throttling effect and the buffering distance of the throttling device 124.

Figure 4:
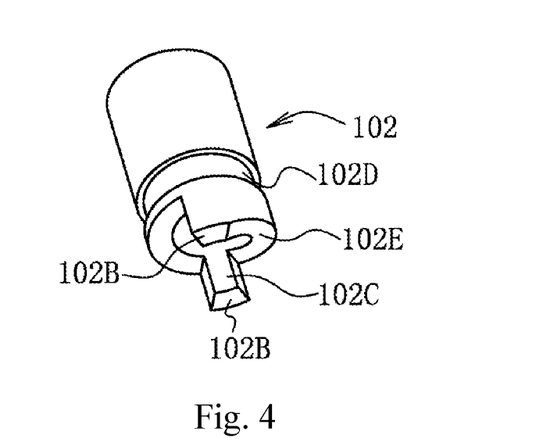
FIG. 4 is a schematic diagram of a three-dimensional structure of a spiral shaft in FIG. 1.
Figure 7:
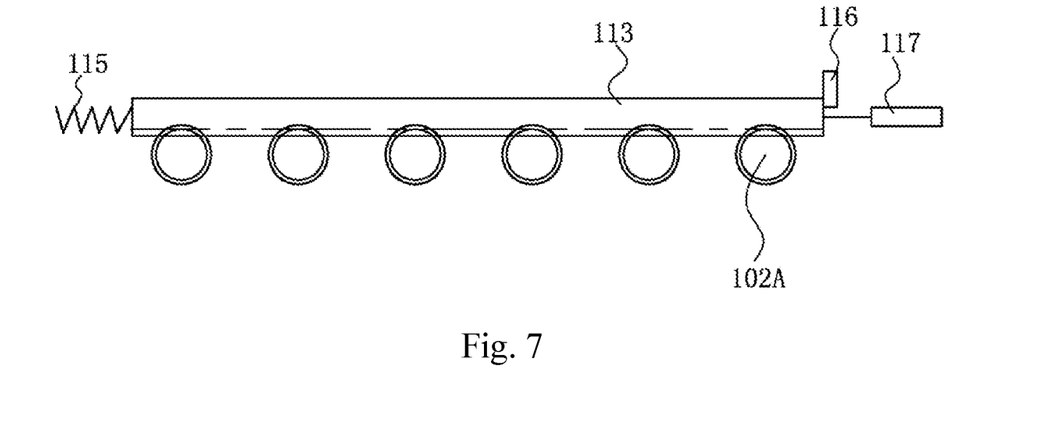
FIG. 7 is a schematic diagram of a gear-rack mechanism for driving the spiral shaft in the embodiment shown in FIG. 1.

As shown in FIG. 1, FIG. 4 and FIG. 7 together, the spiral shaft 102 has a first end and a second end which are oppositely disposed; a spiral surface 102E is provided at the first end; the head of the spiral surface 102E is provided with a spiral shaft abutting plane 102B; the second end is in transmission connection with a gear-rack mechanism; the gear-rack mechanism comprises a control gear 102A and a rack 113; the control gear 102A is arranged at the second end of the spiral shaft 102; the rack 113 is driven by a linear actuator 117 controlled by an ECU of the engine. There are two ways to connect the control gear 102A and the spiral shaft 102. One way is fixed connection, and the other way is that the control gear 102A and the spiral shaft 102 can relatively slide in the axial direction, but cannot relatively rotate, such as key connection, and no matter which connection way is adopted, it must be able to transmit the torque. The linear actuator 117 is a mature technology, and can be a linear motor or an actuation electromagnet or air cylinder or hydraulic cylinder. A connection relationship between the linear actuator and the rack 113 is also well known to those of ordinary skill in the art, and will not be repeated here.

As shown in FIG. 1 and FIG. 4, the spiral shaft 102 is provided with an annular slot 102D; an oil passing hole 102F is formed in the annular slot 102D; the oil passing hole 102F enables the annular slot 102D to communicate with the sliding sleeve cavity Q; the oil inlet hole 107 is always kept in communication with the annular slot 102D in a moving process of the spiral shaft 102.

As shown in FIG. 4, in order to enable the applied force to be more balanced during abutment, the first end of the spiral shaft 102 is also provided with a spiral shaft axial protrusion 102C; the head of the spiral shaft axial protrusion 102C is provided with another spiral shaft abutting plane 102B; and the root of the spiral surface 102E intersects the root of the spiral shaft axial protrusion 102C. The two spiral shaft abutting planes 102B are coplanar, and are symmetric about the center of the spiral shaft 102.

Figure 5:
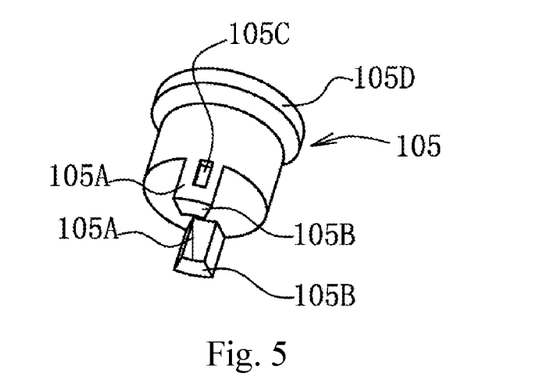
FIG. 5 is a schematic diagram of a three-dimensional structure of a piston in FIG. 1.

As shown in FIG. 1 and FIG. 5, the sliding sleeve 103 is provided with a first positioning pin 119; the piston 105 is provided with a guide slot 105C extending in the axial direction; and the first positioning pin 119 extends into the guide slot 105C. The degree of freedom of rotation of the piston 105C relative to the sliding sleeve 103 is restricted by the first positioning pin 119, so that the piston 105 can only axially move along the guide slot 105C, but cannot rotate.

The end of the piston 105 that is opposite to the spiral shaft 102 is provided with a piston axial protrusion 105A; and the head of the piston axial protrusion 105A is provided with a piston abutting plane 105B. According to the same principle, in order to enable the applied force to be more balanced during abutment, two piston axial protrusions 105A are provided. The heads of the two piston axial protrusions 105A are each provided with one piston abutting plane 105B. The piston abutting planes 105B are in one-to-one correspondence to the spiral shaft abutting planes 102B. The two piston abutting planes 105B are coplanar, and are symmetric about the center of the piston 105.

The working principle of the present invention for controlling the valve to move jointly by the spiral shaft and the camshaft is as follows:

Engine oil within the engine oil circuit (the low-pressure oil circuit) of the engine can flow into the sliding sleeve cavity Q through the oil inlet hole 107 and the limiting oil hole 118. Under the action of the camshaft 101, the spiral shaft 102 moves downward. When the spiral shaft 102 blocks the limiting oil hole 118 (at this time, under the action of the one-way valve 108, the engine oil cannot flow out of the oil inlet hole 107, either), the sliding sleeve cavity Q becomes a closed cavity. The pressure of the hydraulic oil rises to push the piston 105 to move downward. The piston 105 pushes the valve to move downward.

Figure 8:
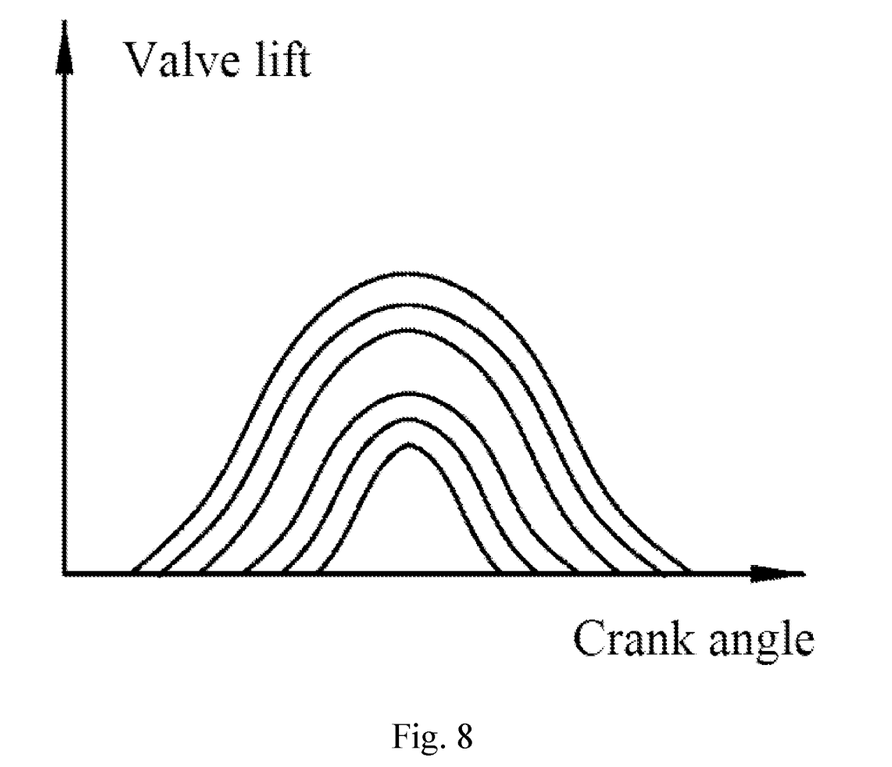
FIG. 8 is a crank angle/valve lift curve chart of the embodiment shown in FIG. 1.

The rack 113 is driven by the linear actuator 117 controlled by the ECU of the engine to move to push the spiral shaft 102 to rotate. After the spiral shaft abutting plane 102B is separated from the piston abutting plane 105B, since the spiral shaft 102 is provided with the spiral surface 102E, the relative position where the spiral shaft 102 blocks the limiting oil hole 118 can be changed by rotating the spiral shaft 102, so as to control the stroke of the piston 105, thereby controlling a lift of the valve. FIG. 8 illustrates a relationship between a valve lift and a crank angle (which is equivalent to a camshaft angle). The outermost curve represents a valve opening curve under the condition that the spiral shaft is only controlled by the cam surface when the spiral shaft abutting plane 102B abuts against the piston abutting plane 105B. At this time, the valve lift is the maximum. The inside curves are different valve opening curves obtained by rotating the spiral shaft 102 to adjust the moment when the spiral shaft 102 blocks the limiting oil hole 118.

During the return stroke, the hydraulic oil enters the sliding sleeve cavity Q from the oil inlet hole 107 via the one-way valve 108 to enable the spiral shaft 102 to be quickly reset together with the position restoring spring 104.

Figure 6:
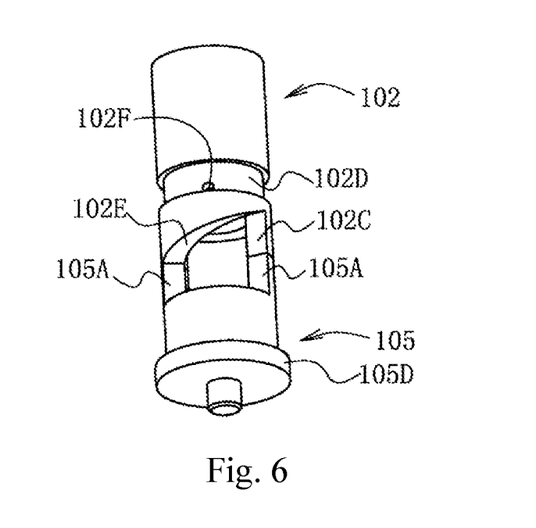
FIG. 6 is a schematic diagram of a three-dimensional structure during abutment of abutting planes of the spiral shaft and the piston in FIG. 1.

After the engine is shut down, and the ECU is powered off, the rack 113 moves rightward to an extreme position limited by the limiting device 116 under the action of a return spring 115. At this time, a position relationship between the piston 105 and the spiral shaft 102 is in a state shown in FIG. 6. That is, the piston abutting plane 105B abuts against the spiral shaft abutting plane 102B. The engine oil within the sliding sleeve cavity Q does not work. The cam and the valve are in a rigid connection state. The valve lift is completely controlled by the camshaft 1, thus avoiding the influence of loss of the engine oil on the normal work of the system.

Figure 2:
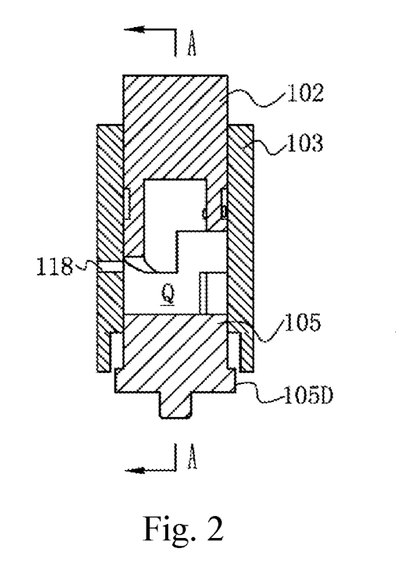
FIG. 2 is a sectional view of a partial structure of the embodiment shown in FIG. 1 cut along a plane formed by the center of a limiting oil hole and the center of a sliding sleeve when a valve is fully closed.
Figure 3:
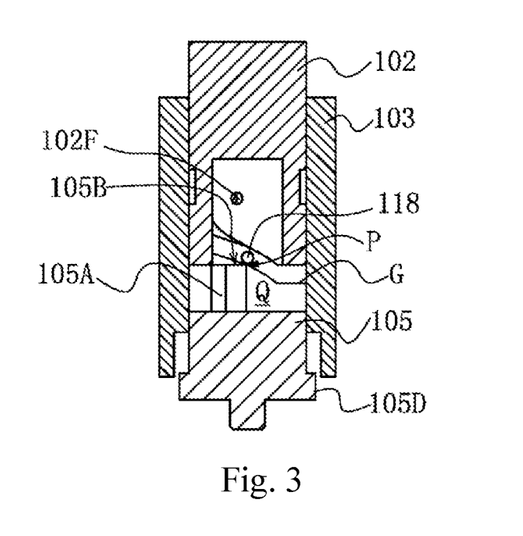
FIG. 3 is a sectional view of A-A in FIG. 2.

In this embodiment, the relative position between the limiting oil hole 118 and the piston abutting plane 105B determines, after the spiral shaft abutting plane 102B is separated from the piston abutting plane 105B, whether the spiral shaft can quickly and effectively block the limiting oil hole 118 before the spiral surface 102E touches the piston abutting plane 105B. As shown in FIG. 2 and FIG. 3, a theoretical spiral surface extreme position G (which is represented by a line segment between two points) passes through a piston abutting plane edge point P. In actual running, the spiral surface 102E should not move downward beyond the theoretical spiral surface extreme position G, otherwise it will collide with the piston abutting plane 105B. Therefore, the limiting oil hole 118 should be located above the theoretical spiral surface extreme position G in the axial direction. In the circumferential direction, the distance from the limiting oil hole 118 to the piston abutting plane edge point P shall also be as short as possible, so that after the spiral shaft abutting plane 102B is separated from the piston abutting plane 105B, the spiral shaft 102 can play a role in blocking the limiting oil hole 118 along with own axial movement by being rotated by an angle that is as small as possible. According to the example shown in FIG. 3, when the valve is closed, the limiting oil hole 118 is located above the piston abutting plane 105B and is close to the piston abutting plane edge point P, so that the use effect is good. Of course, an optimal position of the limiting oil hole 118 is still obtained by analysis according to the kinematic mechanics, and will not be repeated here.

In this embodiment, FIG. 7 illustrates an example in which one rack 113 is simultaneously meshed with six control gears 102A. Each control gear 102A corresponds to one valve assembly, thus being applied to a six-cylinder engine. The concept of the present invention can be extended to a four-cylinder engine or an eight-cylinder engine. The number of air cylinders is not limited.

In this embodiment, a thrust bearing 112 is arranged on the end surface of the control gear 102A, and an anti-wear pad 111 is arranged between the thrust bearing 112 and the cam surface of the camshaft 101, so as to reduce wear. Furthermore, the distance between the piston abutting plane 105B and the spiral shaft abutting plane 102B can be adjusted by the thickness of the anti-wear pad 111. When a non-cam surface of the camshaft 101 abuts against the spiral shaft 102 (or through the anti-wear pad 111 and the thrust bearing 112), the distance between the piston abutting plane 105B and the spiral shaft abutting plane 102B is zero or close to zero.

In this embodiment, the sliding sleeve 103 is provided with a second positioning pin 120. The second positioning pin 120 extends into the annular slot 102D. The axial displacement of the spiral shaft 102 can be restricted by the second positioning pin 120.

The present invention is not limited to the above-mentioned embodiments. All improvements that are made on the basis of the concept, principle, structure and method of the present invention shall fall within the protection scope of the present invention.

INDUSTRIAL APPLICABILITY

1) In the present invention, the spiral shaft and the camshaft are jointly used to control the movement of a valve, and the opening and closing moment of the limiting oil hole is changed by rotating the spiral shaft, thus realizing the functions of the fully variable valve system. During the return stroke, hydraulic oil enters the sliding sleeve cavity from the oil inlet hole to enable the spiral shaft to be quickly reset together with the position restoring spring. The linear actuator controlled by the electric control unit of the engine drives the spiral shaft to rotate, so that the fully variable valve system has high response speed, is convenient to control, replaces an expensive high-speed electromagnetic valve, and is suitable for being used in a multi-cylinder engine.

2) When the valve is going to be seated, the piston firstly collides with the buffering ring; due to the effect of the throttling device, engine oil within the buffering cavity has a damping effect on the movement of the buffering ring to enable the buffering ring to move slowly, such that the valve is slowly seated, thus reducing the impact damage caused to the valve and the sealing surface of the valve seat, thereby effectively prolonging the service life of the valve system. When the valve moves down again, the buffering ring moves downward under the action of the pressure of the engine oil. Since the buffering distance is extremely short, before the valve is seated again, there is enough time for the buffering ring to move to the position of the baffle plate. The valve buffering effect can be adjusting by adjusting the throttling effect and the buffering distance of the throttling device.

3) After the engine is shut down, and an ECU is powered off, the rack moves to the extreme position of the limiting device under the action of the return spring; at this time, the piston abutting plane abuts against the spiral shaft abutting plane, and the engine oil does not work; the cam and the valve are in a rigid connection state; a valve lift of the valve assembly is completely controlled by the camshaft, so that the influence caused by loss of the engine oil on the normal work of the system is avoided.

What is claimed is:

1. A fully variable electro-hydraulic valve system having a buffering function, comprising:

a camshaft and a valve assembly;

a sliding sleeve, a spiral shaft, a piston and a position restoring spring, wherein the sliding sleeve is fixed relative to an engine; the spiral shaft and the piston are connected to the sliding sleeve in a sliding sealing manner; an inner cavity between the spiral shaft and the piston is referred to as a sliding sleeve cavity; the position restoring spring is clamped between the spiral shaft and the piston; the piston abuts against the valve assembly; and the spiral shaft is controlled by a cam surface of the camshaft in the axial direction;

wherein the spiral shaft has a first end and a second end which are oppositely disposed; a spiral surface is provided at the first end; the second end is in transmission connection with a gear-rack mechanism; the gear-rack mechanism comprises a control gear and a rack; the control gear is arranged at the second end of the spiral shaft; and the rack is driven by a linear actuator controlled by an electric control unit of the engine;

wherein an oil inlet hole and a limiting oil hole are formed in the sliding sleeve and communicate with a low-pressure oil circuit of the engine; a one-way valve is arranged on a connecting pipeline between the oil inlet hole and the low-pressure oil circuit of the engine;

wherein a step hole structure is provided at an end, where the piston is located, of the sliding sleeve and comprises a large hole and a small hole; the small hole is matched with a sliding sealing surface of the piston; a buffering ring is arranged in the large hole; the buffering ring sleeves the sliding sealing surface of the piston and is in sliding sealing fit with an inner circumferential surface of the large hole; the buffering ring and the piston form a buffering cavity in the step hole; a flange used for colliding with the buffering ring when a valve of the valve assembly is seated is arranged on a circumferential surface of an outer end of the piston; a baffle plate is mounted at the end, where the piston is located, of the sliding sleeve; and when the valve of the valve assembly is closed, a buffering distance is reserved between the buffering ring and the baffle plate; and wherein a buffering oil hole communicating with the buffering cavity is formed in the sliding sleeve; and the buffering oil hole communicates with the low-pressure oil circuit of the engine by means of a throttling device.

2. The fully variable electro-hydraulic valve system having a buffering function according to claim 1, characterized in that:

the spiral shaft is provided with an annular slot and an oil passing hole is formed in the annular slot, the oil passing hole enabling the annular slot to communicate with the sliding sleeve cavity, wherein the oil inlet hole is always kept in communication with the annular slot in a moving process of the spiral shaft;

a head of the spiral surface of the spiral shaft is provided with a spiral shaft abutting plane; an end of the piston that is opposite to the spiral shaft is provided with a piston axial protrusion; and a head of the piston axial protrusion is provided with a piston abutting plane;

the sliding sleeve is provided with a first positioning pin; the piston is provided with a guide slot extending in the axial direction; and the first positioning pin extends into the guide slot;

the limiting oil hole is arranged at a position where the limiting oil hole is blocked by the spiral shaft before the spiral surface touches the piston abutting plane; and the gear-rack mechanism is provided with a limiting device and a return spring, wherein when the return spring enables the rack to move to an extreme position defined by the limiting device, the piston abutting plane abuts against the spiral shaft abutting plane, and wherein a valve lift of the valve assembly is controlled by the camshaft.

3. The fully variable electro-hydraulic valve system having a buffering function according to claim 2, characterized in that the first end of the spiral shaft is provided with a spiral shaft axial protrusion; a head of the spiral shaft axial protrusion is provided with another spiral shaft abutting plane; a root of the spiral surface intersects a root of the spiral shaft axial protrusion; two piston axial protrusions are provided; the heads of the two piston axial protrusions are each provided with one piston abutting plane; and the piston abutting planes are in one-to-one correspondence to the spiral shaft abutting plane.

4. The fully variable electro-hydraulic valve system having a buffering function according to claim 3, characterized in that the two piston abutting planes are coplanar, and the two spiral shaft abutting planes are coplanar.

5. The fully variable electro-hydraulic valve system having a buffering function according to claim 3, characterized in that the two piston abutting planes are symmetric about the center of the piston, and the two spiral shaft abutting planes are symmetric about the center of the spiral shaft.

6. The fully variable electro-hydraulic valve system having a buffering function according to claim 1, characterized in that the second end of the spiral shaft is provided with a thrust bearing, and an anti-wear pad is arranged between the thrust bearing and the cam surface of the camshaft.

7. The fully variable electro-hydraulic valve system having a buffering function according to claim 1, characterized in that the control gear is connected to the spiral shaft in a manner of transmitting a torque.

8. The fully variable electro-hydraulic valve system having a buffering function according to claim 1, characterized in that the rack is simultaneously meshed with control gears of a plurality of spiral shafts.

9. The fully variable electro-hydraulic valve system having a buffering function according to claim 1, characterized in that the linear actuator is a linear motor or an actuation electromagnet, air cylinder, or hydraulic cylinder.

10. The fully variable electro-hydraulic valve system having a buffering function according to claim 2, characterized in that the sliding sleeve is provided with a second positioning pin which extends into the annular slot.

\* \* \* \* \*